UNITED STATES PATENT OFFICE.

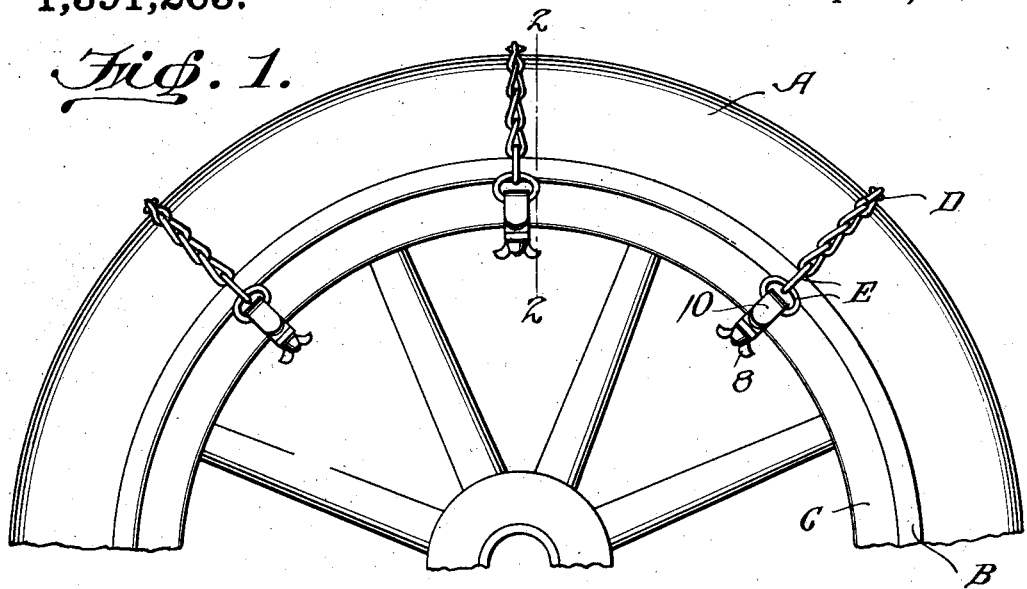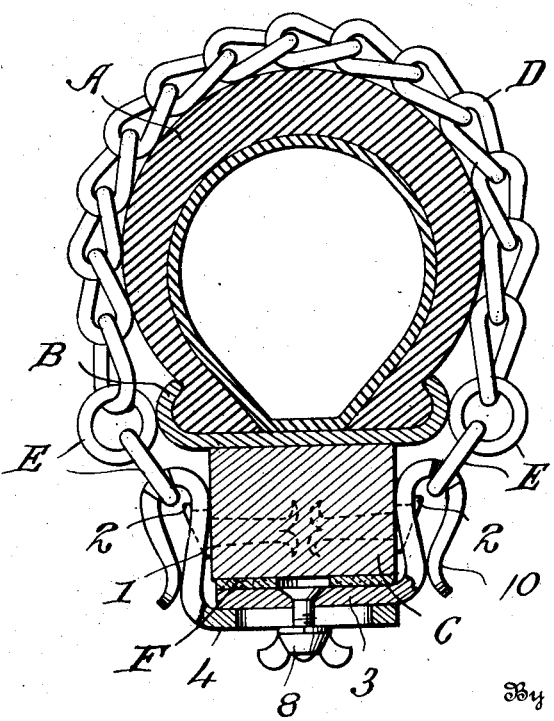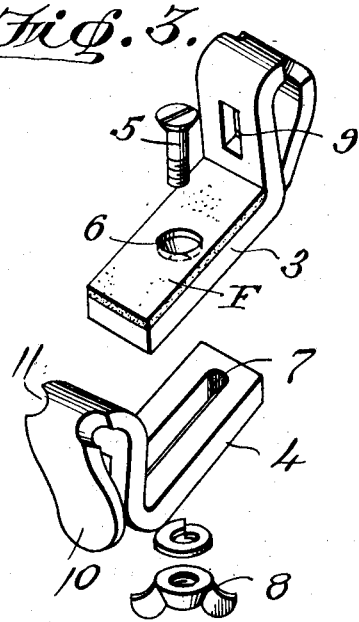

WILLIAM H. McLAUGHLIN, OF HARTFORD, CONNECTICUT, ASSIGNOR TO CASSIUS S. CHASE, OF HARTFORD, CONNECTICUT.

TRACTION DEVICE.

1,391,263.     Specification of Letters Patent.    Patented Sept. 20, 1921.

Application filed July 13, 1917. Serial No. 180,329.

*To all whom it may concern:*

Be it known that I, WILLIAM H. McLAUGHLIN, a citizen of the United States, residing at Hartford, in the county of Hartford and State of Connecticut, have invented certain new and useful Improvements in Traction Devices, of which the following is a specification.

This invention relates to clamps or attaching means intended more especially for use on the wheels of the heavier types of pleasure and business automobiles to receive and hold the terminal links of anti-skidding chains, though capable of use in a number of different arts.

The primary object of this invention is to provide a device of this character which may be applied to, and removed from, the felly of a wheel with the hand without the assistance of any tools, which may be adjusted in similar manner to fit a number of fellies of different widths, and which will have but few parts.

In the accompanying drawings:

Figure 1 represents a view, in side elevation, of a segment of a wheel with devices embodying my invention applied thereto;

Fig. 2, a cross-section view on the line 2—2 of Fig. 1, the hooks, screw and nut being shown in elevation; and Fig. 3, a superposed perspective view of all parts of the device separated.

Referring now in detail to the drawings, A designates the pneumatic tire of the wheel, B the rim, C the felly, and D the anti-skidding chain provided on each end with two rings or round links E.

The felly C is provided at intervals with pairs of nails or studs 1 having split points and driven into the felly from its sides, the studs of each pair being driven in from diametrically opposite points of the sides of the felly so that they will have a common central longitudinal line.

The head of each stud or nail 1 has a shoulder lying against the face of the felly and has its outer face inclined inwardly toward the inner periphery of the felly C and is provided with a short lip 2 presented toward the rim B.

Adjustable clamps or clips consisting of two plates 3 and 4 held in adjusted relation to each other by a bolt 5 passing through a beveled hole 6 in plate 3 and a longitudinal slot 7 in plate 4 and a wing nut 8 turned on the end of bolt 5 are provided with sides preferably integral with the respective plates 3 and 4 and having slots 9 to receive the heads of said studs 1 and fit between the lips 2 respectively and the adjacent faces of the felly C.

These sides are drawn in slightly toward each other in assembled position and have their ends bent outwardly and back to form hooks 10 which have their end portions slightly reduced in thickness to increase their resiliency at their points of engagement with the outer faces of the respective sides, and have their tip ends bent outward slightly so that the links E may be readily forced between the ends of their respective hooks 10 and the adjacent faces of said sides of the clamp or clip.

The face of the plate 3 presented toward the felly C may be lined with a rubber treated textile fabric F, as shown in Figs. 2 and 3, to prevent marring the surface of said felly C.

The length of the clamp or clip, as assembled, may be adjusted to correspond to the width of any felly, within the two extremes of its adjustability, by loosening the nut 8, sliding the plates 3 and 4 over each other until the sides thereof firmly engage the side faces of the felly C and are put under a tension, when the nut 8 will be tightened up, holding said plates immovable with relation to each other.

The preferred way to use the clip, or clamp, after it has once been adjusted to the width of the particular felly, is to snap or force it on, the bridge of the clamp as adjusted, being slightly longer than the width of the felly C, allowing the clip as a whole to be slightly deformed in applying until the edges of slots 9 pass the edges of lips 2, when the clamp or clip will spring back into normal shape, drawing its sides toward the inner periphery of the felly C so that the material of the sides adjacent the edges of slots 9 will be drawn between the sides of the felly C and the lips 2 of the respective nails or studs 1.

To remove the easiest way is to detach one end of the chain D from its respective hook 10, swing it over the tire and pull the chain laterally of the wheel, thus pulling the side of the clip or clamp, to the hook of which it is still attached, away from the side of the felly C and free of the lip 2, when the resiliency of the clamp or clip will force it free from the felly C and the other lip 2.

For use with very heavy automobiles it may be found best to make the plates 3 and 4 of such dimensions that they will have but little resiliency and be very difficult to apply and remove in the manner indicated above, in which case they may be applied and removed by loosening the nut 8 and moving the parts with relation to each other.

In practice each plate will be integral with its slotted side 9 and its hook 10, being preferably stamped from a single piece of heavy resilient sheet metal.

If desired the material of each hook 10 may be cut out on each side adjacent its point of bending, as at 11, to position its terminal link 3, as shown in Figs. 2 and 3.

Having thus described my invention, what I claim as new and desire to secure by Letters Patent is:

1. A wheel felly, in combination with two resilient plates adjustable with relation to each other to engage the opposite faces of said felly, means for holding said plates in adjusted relation to each other, said felly and said plates being provided with interengaging means, some of the engaging faces of which extend in a plane transverse of said felly, and a traction element removably connected to said plates, the sides of said plates being provided with means to receive the respective terminal portions of said traction element, the device as a whole being removable, without movement of the plates relative to each other and without affecting the adjusted relation of the parts, by disengaging one of the sides of said resilient plates by a lateral pull.

2. A wheel felly, in combination with two plates having resilient side portions and adjustable with relation to each other to engage the opposite faces of said felly, means for holding said plates in adjusted relation to each other, said felly and said plates being provided with positive interengaging means, some of the engaging faces of which extend in a plane at an angle to the planes of frictional engagement between said plates and said felly, the sides of said plates being provided with means to removably receive the respective terminal portions of a traction element, and a traction element thus connected to said plates, the device as a whole being removable, without movement of the plates relative to each other and without affecting the adjusted relation of the parts, by disengaging the resilient side of one of said plates by a lateral pull.

3. A wheel felly provided with permanent parts projecting from its lateral faces, in combination with an anti-skid element extending around the tire thereof, plates attached to the terminal portions of said element and having side portions provided with openings to receive said projections respectively and having portions formed at angles to their side portions and lying substantially parallel to the inner peripheral face of the adjacent portion of the felly and transversely of the same, and frictional means for clamping the two plates together in adjusted relation whereby the two plates may be quickly adjusted and locked together on the felly.

In testimony whereof, I have signed my name to this specification in the presence of two subscribing witnesses.

WILLIAM H. McLAUGHLIN.

Witnesses:
E. S. BESTOR,
E. G. KANE.